United States Patent [19]
Johnson

[11] Patent Number: 5,110,190
[45] Date of Patent: May 5, 1992

[54] HIGH MODULUS MULTIFILAMENT SPOKES AND METHOD

[76] Inventor: Harold M. Johnson, 2903 Legion Ave. N., Lake Elmo, Minn. 55042

[21] Appl. No.: 495,281

[22] Filed: Mar. 16, 1990

[51] Int. Cl.$^5$ .............................................. B60B 1/00
[52] U.S. Cl. ........................................ 301/55; 301/58; 301/59; 301/104
[58] Field of Search ............ 301/55, 56, 57, 58, 301/59, 61, 63 PW, 104, 105 B; 152/17, 75

[56] References Cited

U.S. PATENT DOCUMENTS

| | | | |
|---|---|---|---|
| 1,243,130 | 10/1917 | Beckwith | 152/17 |
| 3,063,966 | 11/1962 | Kwolek et al. | 260/78 |
| 3,600,350 | 8/1971 | Kwolek | 260/32.6 |
| 3,608,971 | 9/1971 | Seibold | 301/58 |
| 3,671,542 | 6/1972 | Kwoleck | 260/30.8 |
| 3,819,587 | 6/1974 | Kwoleck | 260/78 R |
| 3,847,443 | 11/1974 | Laurion | 301/37 |
| 4,413,110 | 11/1983 | Kavesh et al. | 526/348.1 |
| 4,430,383 | 2/1984 | Smith et al. | 428/364 |
| 4,551,296 | 11/1985 | Kavesh et al. | 264/177 F |
| 4,602,823 | 7/1986 | Berg | 301/55 X |
| 4,620,749 | 11/1986 | McEachern | 301/37 |
| 4,681,647 | 7/1987 | Kondo et al. | 156/172 |
| 4,682,821 | 7/1987 | Strazis | 301/37 |
| 4,712,838 | 12/1987 | Berg et al. | 301/37 |
| 4,729,605 | 3/1988 | Imao et al. | 301/58 X |
| 4,732,428 | 3/1988 | Monte | 301/63 |
| 4,741,578 | 5/1988 | Viellard | 301/63 |
| 4,836,615 | 6/1989 | Berg et al. | 301/37 |

FOREIGN PATENT DOCUMENTS

| | | |
|---|---|---|
| 565017 | 3/1958 | Belgium . |
| 0190968 | 8/1986 | European Pat. Off. . |
| 0295194 | 12/1988 | European Pat. Off. ............. 301/58 |
| 03687480 | 5/1990 | European Pat. Off. . |
| 83411 | of 0000 | Fed. Rep. of Germany ........ 301/55 |
| 96392 | 3/1898 | Fed. Rep. of Germany . |
| 145296 | 10/1903 | Fed. Rep. of Germany . |
| 175179 | 9/1905 | Fed. Rep. of Germany . |
| 8907773 | 8/1989 | Fed. Rep. of Germany . |
| 9012395 | 12/1990 | Fed. Rep. of Germany . |
| 531780 | 1/1922 | France ................................ 301/57 |
| 962372 | 6/1950 | France ................................ 301/59 |
| 981709 | 5/1951 | France ................................ 301/59 |
| 0079702 | 6/1980 | Japan ................................... 305/58 |
| 537437 | 11/1983 | U.S.S.R. . |
| 1303440 | 4/1987 | U.S.S.R. ............................. 301/55 |
| 30524 | of 1897 | United Kingdom ................ 301/55 |
| 1981 | of 1902 | United Kingdom ................ 301/55 |
| 2093778 | 9/1982 | United Kingdom ......... 301/63 AN |

OTHER PUBLICATIONS

Bicycle Guide advertisement, "New 'Pro' Uni-Disc", p. 109.
J. S. Rinehart & J. Pearson, *Behavior of Metals Under Impulsive Loads*, 1954, pp. 11-15.
J. Y. Mann, *Fatigue of Materials*, 1967, pp. 1-4, 10-12, 82-83 and 129.
E. G. West, *Copper and its Alloys*, 1982, pp. 136-139.
"Apparatus Impregnates Weak Fibers", NASA Tech-Briefs, May 1989, vol. 13, No. 5, pp. 84-85.
Technical Data, FORTAFIL ® Carbon Fibers, Great Lakes Carbon Corporation, 1986.
"KEVLAR ® Aramid, The Fiber That Lets You Re--think Strength and Weight", Product Data Brochure Publication No. E38532.
"KEVLAR ® Aramid, The Miracle is All Around You", Product Brochure.
"Characteristics and Uses of KEVLAR ® 49 Aramid High Modulus Organic Fiber", Product Brochure Publication No. A-88945, Sep. 1981.
*Materials Engineering*, Dec. 1988, pp. 31-68.
Fahrradtechnik, Copyright 1989.

(List continued on next page.)

Primary Examiner—Russell D. Stormer
Attorney, Agent, or Firm—Merchant, Gould, Smith, Edell, Welter & Schmidt

[57] ABSTRACT

A high modulus multifilament non-rigid and rigid wheel spoke including a fiber mid-portion between a first and second end having attachment members affixed thereto. Also disclosed are methods of supporting a hub within a wheel rim by means of a plurality of spokes or by means of continuous lengths of spokes.

43 Claims, 5 Drawing Sheets

OTHER PUBLICATIONS

"KEVLAR® 49 Aramid For Canoe, Kayak, and Small Boat Construction", Product Brochure Publication No. E-43688.

"DuPont Aramids for Advanced Composites", article by H. Y. Loken, Bulletin No. E-50694-2.

"KEVLAR® Aramid Characteristics and Uses of KEVLAR® 29 Aramid", Product Data Brochure Publication No. E-21451. Sep. 28, 1976.

"KEVLAR® 29 Aramid Yarn and Roving For Cables, Cordage, and Woven Goods", No. DPMS-2, C-70, May 17, 1980.

HIGH MODULUS MULTIFILAMENT SPOKES AND METHOD

FIELD OF THE INVENTION

The invention generally relates to wheel components for various types of vehicles. More specifically, the invention relates to low density, high modulus fiber spokes for rim and hub wheels.

BACKGROUND OF THE INVENTION

The wheel is one of man's oldest inventions. Traditionally, wheels such as those used on an automobile are constructed of a rim and hub which are used to support an inflated tire which is subsequently fastened to a rotatable axle on a vehicle. Bicycle rims have utilized a slightly different approach towards rim construction. The bicycle wheel design is aimed at minimizing weight and maximizing strength. This allows human power to drive the bicycle in an energy efficient manner.

Generally, a bicycle wheel consists of a rim and hub which are strung together with connecting spokes that serve to balance and center the hub within the circumference of the rim. The connecting spokes are generally fabricated from steel or some other metal alloy.

In the past, the composition of spokes has been dictated by the fact that spokes represent stress concentration points along the circumference of the rim when used to construct a wheel. Generally, the number of metallic spokes used to construct a conventional wheel is deliberately minimized to reduce weight while maintaining adequate structural strength. This approach increases the distance between adjacent spokes and creates a high stress along the axis of the spoke. As a result the spokes may break or have to be strengthened by adding any variety of mechanisms to the wheel. The latter alternative frustrates the initial objective of weight reduction.

However the present technology of wheel spokes has certain drawbacks based largely on the design and composition of the spokes. For example, by subjecting metallic spokes to high stress levels, the usable stress range—for shock absorption purposes—within the spoke is decreased. This situation is compounded by elastic hysteresis under the imposed tensile stress which seriously minimizes the long term durability of the spoke. The yielding or creep behavior of metal alloys is an inherent stress relieving mechanism and a principal cause of the hysteresis. As a result, most metal spokes are compositionally incapable of damping vibrations unless they fail or irreversibly stretch.

The phenomenon of irreversibly stretching is generally referred to as lack of memory. Lack of memory in context means that the specific metal article will tend to permanently stretch or distort when subjected to stress and strain during use. In short, when subjected to forces of constant magnitude, metals will tend to remember the stress and strain they encounter and flex and yield in the direction of these forces. This memory phenomenon is a principal stress relieving mechanism. As a result, permanent disfigurement occurs and, metal spokes become weak and harder to tighten and, in turn, true over time.

Another problem of metal alloy spokes is that under too great an amount of stress they may fail. Failure of metal spokes is routinely unpredictable and generally complete, potentially resulting in the complete failure of the wheel.

Furthermore, this failure profile is often exacerbated by the inflexibility of metal spokes. Rigid metal spokes must often be stressed or strained to be installed. Due to the basic design of the wheel and the inherent character of metals to remember stress and strain forces, this initial bending or disfigurement may result in fatigue, yielding and failure after installation, and during use.

Accordingly, a need exists for a light weight wheel spoke or spoke material which is strong enough to provide a durable support element for hub and rim wheels.

SUMMARY OF THE INVENTION

The present invention comprises a spoke having a flexible mid-portion between means of attachment affixed to either end of the spoke. Preferably, the spoke of the present invention comprises high strength, low density fibers capable of being attached in hub and rim wheels through any variety of attachment means. In alternative embodiments, the spoke of the present invention may comprise a continuous non-rigid spoke. Any variety of means of attachment may be used for these spokes such as, for example, including dimpled heads, knotting, molded threads, presser feet, rivets, or eye hooks among others.

The spoke design of the present invention serves to support the center hub and axle through tensile suspension as opposed to compressive suspension which is how a traditional vehicle wheel rim functions. Vibrational energy and sudden shock waves may also be dissipated or dampened within the multifilament fiber spoke. This invention overcomes the inherent deficiencies of metallic materials and provides a novel shock absorbing wheel which is capable of minimizing road created vibration and shock.

This invention also includes methods of using the spokes designed according to the principles of this invention to attach hub and rim wheel sections together.

An alternative embodiment of the present invention is a rigid unitary composite spoke having a rigid mid-portion between attachment means affixed to either end of the spoke. Additionally, a first attachment means may be affixed adjacent the spoke first end, and a second attachment means may be affixed adjacent the spoke second end.

These spokes also provide a unique stress/strain curve which is nearly linear to the point of failure, along with a superior strength to weight ratio when compared to metallic materials. The spokes resist creep or stress yielding overcoming hysteresis within the spoke and minimizing the need to "true" or realign the wheel.

Other advantages will become evident in the detailed description of the invention.

BRIEF DESCRIPTION OF THE DRAWINGS

FIG. 7a is a side view of a fourth embodiment of a spoke constructed according to the principles of the present invention, with portions thereof broken away, and shown attached to portions of a hub and wheel rim.

FIG. 7b is a cross-sectional fragmentary view through the hub of FIG. 7a taken generally along the line 7b–7b of FIG. 7a, illustrating attachment of the spoke to the hub.

FIG. 8a is an exploded perspective view of a fifth embodiment of a spoke constructed according to the principles of this invention illustrating the continuous nature of the spoke.

FIG. 8b is a fragmentary side view of an attachment sleeve means for use with the spoke of FIG. 8a.

FIG. 8c is a fragmentary perspective view of an alternative technique for attaching the spoke of FIG. 8a to a hub.

FIG. 9b is a fragmentary side view of the spoke pattern of FIG. 9a.

FIG. 10a is a fragmentary side view of a sixth embodiment of a spoke of the present invention, illustrating the spoke with a threaded attachment means.

FIG. 10b is an exploded fragmentary cross-sectional view of the attachment means of the spoke depicted in FIG. 10a, generally taken along the line 10b—10b of FIG. 10a.

FIG. 11 is a perspective view of a vehicle with wheels incorporating spokes configured according to the principles of the present invention.

FIG. 12 is a side view of one embodiment of a rigid composite spoke of the present invention.

FIG. 13 is an exploded fragmentary perspective view illustrating attachment of the spoke of FIG. 12 to a hub.

THE DETAILED DESCRIPTION OF THE INVENTION

Figures 1A, 1B, 2, 3, 4, 5A, 5B, 5C, 5D, 5E, 5F, 5G:
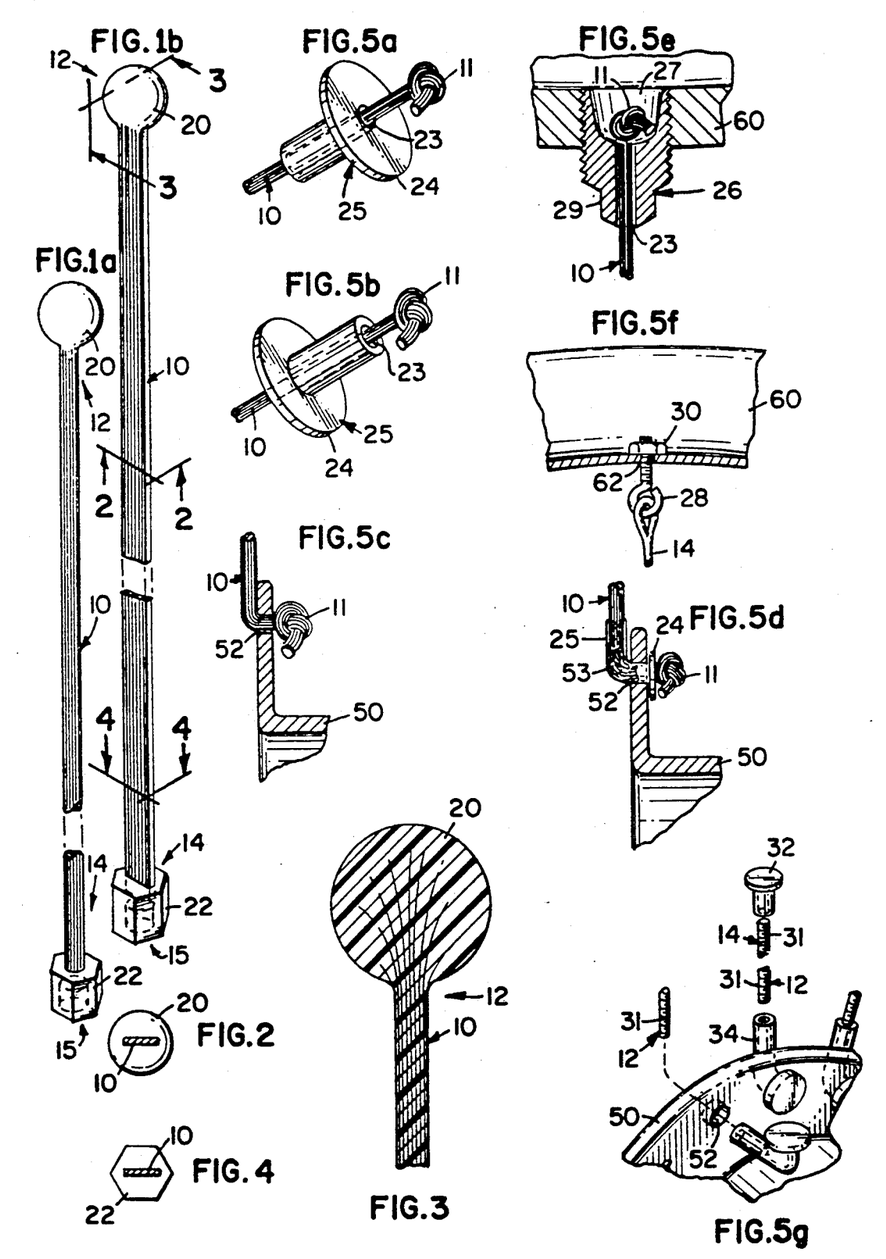
FIGS. 1a and 1b are side perspective views of first and second embodiments of spokes configured according to principles of the present invention.
FIG. 2 is a cross-sectional view of the spoke of FIG. 1b, taken along line 2—2 of FIG. 1b.
FIG. 3 is a partial cross-sectional view of one end of the spoke of FIG. 1b, taken along line 3—3 of FIG. 1b.
FIG. 4 is a cross-sectional view of the spoke of FIG. 1b, taken along line 4—4 of FIG. 1b.
FIGS. 5a and 5b are partial perspective views showing one technique for attaching spoke constructed according to principles of this invention to a hub and rim respectively.
FIGS. 5c–5f are partial cross-sectional views illustrating various alternative techniques for attaching spokes of the present invention to hubs and rims.
FIG. 5g is an enlarged fragmentary view of a hub showing one means of attaching spokes of the present invention to the hub.

Referring to the drawing wherein like numerals represent like parts throughout the several views, there is generally shown a non-rigid wheel spoke, FIGS. 1a and 1b, having a first end 12 and a second end 14 with a non-rigid mid-portion 10. Any variety of attachment means can be affixed to the non-rigid wheel spoke of the present invention. As seen in FIG. 1a, the dimpled or enlarged head 20 is formed at the first end 12 of the non-rigid wheel spoke, while a presser foot 22 is formed at the second end 14 of the non-rigid wheel spoke of the present invention.

In the context of this invention "nonrigid" means the respective spoke material will flex freely or flex when subjected to mechanical force without failing. In contrast, the term rigid in the context of this invention refers to materials or composite materials which will not flex freely or flex when subjected to mechanical force without partially or completely failing.

Turning first to the non-rigid mid-portion of the wheel spoke shown in FIGS. 1a and 1b, this non-rigid portion functions to provide a maximum amount of strength and wear over the life of the spoke. Preferably the spoke has a fiber structure which will indicate when the spoke is becoming worn and frayed prior to the complete failure of the spoke material. This non-rigid mid-portion also functions to provide a substrate for forming or implanting various types of attachment means to the spoke as well as securing these attachment means through simple actions such as tying the first or second end of the spoke.

In use, the non-rigid mid-portion of the spoke provides an internal damping mechanism where road shock or other vibration may be absorbed instead of being transferred through the vehicle frame to the operator. The intermediate non-rigid spoke area also facilitates the ability of the present invention to function as a flexible transportable light weight article capable of being easily stored and transported as well as installed in emergency situations.

For example a bicycle wheel spoke constructed according to this invention may be easily carried by touring or even racing cyclists and inserted into the wheel upon the failure of a pre-existing spoke. Moreover, the ready flexibility of the spoke allows it to be easily manipulated and inserted between the hub and rim for easy application and use.

An added advantage of the present invention is it's light weight. Specifically, given the lighter weight of the high strength fiber spoke, a wheel constructed from spokes of the present invention will require far less inertial force to initiate movement and much less energy to maintain any given velocity over any period of time.

Generally, the non-rigid mid-portion of the wheel spoke may comprise any number of materials which function in accordance with those parameters provided above. Specifically, materials which have been found useful in the present invention are those which when placed under an axial strain in a direction predominantly normal to the wheel hub in the rim allow the beneficial physical strength properties of such materials to be exploited.

Those materials which have been found especially useful include low density, high strength fibers which exhibit minimum creep at variable stress levels or, at constant strain levels, maintain uniform stress. Preferably, these materials also provide a minimum loss in strength over the period of use. Fibers which have been found useful in the present invention are those having a low density, a high modulus of elasticity (Young's modulus), reduced elongation, and high tensile strength. Also, the most preferred fibers useful in the present invention display a nearly linear stress-strain curve up to the point of failure or breakage. Generally, the spoke of this invention is formed so that these fibers run continuously from end-to-end within the body of the spoke. In other words, when subjected to stress measured in units of force, the preferred filaments provide a linear strain response measured in unit length to the point at which the fiber breaks.

Specifically, the density of the fibers used in the present invention ranges from 0.95 gm/cc to about 6.00 gm/cc, preferably from 0.97 gm/cc to about 3.20 gm/cc and most preferably from about 0.97 gm/cc to about 2.75 gm/cc.

Meanwhile, the Young's modulus or modulus of elasticity of the fibers useful in the present invention is greater than 1 million psi, preferably ranging from about 5 million psi to 125 million psi, and most preferably from about 10 million psi to 60 million psi.

Also, when stressed or strained, the fibers used in the present invention will provide an ultimate elongation or elongation at failure of about 0.01% to 20%, preferably about 0.1% to 10%, and most preferably 0.3% to 6%.

Finally, the fibers useful in the present invention may be characterized as those having a tensile strength of at least $0.1 \times 10^6$ psi, more preferably having a tensile strength from about $0.2 \times 10^6$ psi to $0.7 \times 10^6$ psi, and most preferably having a tensile strength from about $0.3 \times 10^6$ psi to $0.6 \times 10^6$ psi.

According to one preferred embodiment of the present invention, fibers which have been found especially useful include materials such as aramid fibers, carbon fibers, boron fibers, graphite fibers, glass fibers, high density polyethylene fibers, other high density polyolefin fibers or any other combination thereof. Also, useful are fiber bundles or strands which combine metal alloy fibers such as copper alloys and the like polymer fibers such as those provided above.

As can be seen in FIG. 1a, the fibers are generally oriented in a near linear manner adjacent to each other throughout the length of the spoke. In FIG. 1a the fibers are formed or gathered in a columnar or cylindrical shape. Alternatively, the fibers may take a more flat, ribbon-like configuration, FIG. 1b. The spoke has a first end 12 which is generally attached at the wheel hub, and a second end 14 which is generally attached at the wheel rim. As can be seen throughout the Figures and specifically in FIGS. 2-4 and 5a-5g, any variety of means may be used to affix the non-rigid spoke to either the wheel hub 50 or the wheel rim 60. Generally, the attachment means used with the non-rigid wheel spoke of the present invention function to attach the non-rigid spoke in a manner which will maintain the structural integrity of the rim and the wheel.

The non-rigid mid-portion of the present invention may also be coated in order to protect the non-rigid material from degradation by environmental elements such as ultraviolet radiation, surface abrasion or any other agent which the spokes may come into contact with during manufacture and use. Coating materials which have been found useful in the present invention generally include thermoplastic and thermosetting resins among other agents. Braiding and weaving patterns are also within the scope of the present invention. For example, fibers useful in the present invention may accomplish the same function by radially wrapping the fiber bundle with a lighter weight fiber forming a sleeve which will serve to secure the fiber bundle and protect the main load bearing fibers of the spoke. It should also be understood that fillers, curatives, sizing agents, among other additives can also be incorporated into the resin coating systems.

A non-rigid mid-portion of the present invention may be coated through any means known to those with skill in the art including wire coating, dye coating, thermoplastic and thermoset pultrusion, insert molding, dip coating, spray coating, among other methods.

This embodiment of the present invention provides a non-rigid spoke having high strength and low density which should be combined with attachment means which reflect the high strength of the spoke material. Moreover, the attachment means should allow a high strength attachment of the spoke to the hub or rim while concomitantly allowing for the detachable fixing of this spoke to either the wheel hub or rim so that if there is a failure of the spoke it may be removed from the wheel and replaced. Accordingly, any variety of attachment means may be used at either the first end 12 or the second end 14 of the non-rigid spoke, FIGS. 1a and 1b, including spoke knotting, formation of light weight metal alloy hardware, or impregnation with resins.

Processes for forming metal hardware on the spoke of the present invention may be any of those generally known to those of skill in the art. In the formation of light weight metal hardware on the non-rigid spoke of the present invention, impregnation of these metal alloys into the non-rigid spoke material and the tolerance of the material is an important consideration. Direct casting of attachment means onto either end of the mid-portion of the present invention must not affect the mechanical properties of the fibers comprising that mid-portion. For instance, polyethylene class fibers may not survive many types of molten, injection molding operations. However, aramid fibers can survive such processes.

An important consideration is removing the heat and quenching the alloy before the heat has had time to effect the fibers. Hardware may also be cast and/or machined with a receptacle or opening to accept the end of the non-rigid spoke without directly impregnating the metal into the fiber. In this instance the end of the spoke is extended through the hardware having a preformed opening and enlarged through any variety of means, e.g. knotting or resin impregnation, to prevent release of the spoke end from the hardware.

The preferred hardware metals and alloys possess modulus and tensile strengths in the same range as the fiber used in the non-rigid mid-portion of the present invention. However, their elongation values are typically greater than those found in the fibers used in the present invention. Many metals do possess significant yielding properties which when stressed may diminish their ability to function as a spoke. An important consideration in the present invention is the capability for the spoke to have a near linear stress-strain curve when used as a wheel spoke.

Generally, alloys which are useful as hardware elements in the present invention include alloys of copper, iron, zinc, tin, magnesium, manganese, beryllium, nickel, aluminum, indium, chromium, titanium, tungsten, among others.

Resinous materials may also be used to form spoke hardware which will facilitate attachment of the present invention to the wheel hub and rim. Generally, any type of resinous materials including thermoplastics and thermosetting plastics may be used to form attachment hardware. Thermosetting resins useful in the present invention may, for example, include epoxies, polyurethanes, silicones, polyesters, acrylics, polyimides, and polybutadienes. Moreover, thermoplastics useful in this invention include polyphenylene sulfide, polyformaldehyde or acetal polyurethanes, polyamides including nylon-(6,6), nylon-(6), nylon-(6.12), nylon-(11), nylon-(12), polypropylene, polyethylene, polyether ketone, polybutylene terephthalate, polyethylene terephthalate, polycarbonate, polystyrene, styrene acrylonitrile, polyether imide, and polyamide imide among others.

Processes useful for forming resinous hardware by impregnating the flexible spoke of the present invention include those processes known to those with skill in the art including insert molding or compression molding among other processes.

Turning first to the spoke shown in FIGS. 1a and 1b, affixed to the first end 12 of the spoke is a dimpled head 20 which may be created by any number of means including implanting various resins such as thermoplastic resins, thermosetting resins, or even lightweight metals in among the fibers to form a high strength node or head 20 which will hold the first end of the spoke in the hub. This dimpled end may merely be a broadened end, FIG. 2, within which the fibers of the non-rigid spoke 10 are implanted during manufacture.

In cross-section the dimpled end 20 is applied as the attachment means of the first end 12 by splaying the first end of the non-rigid spoke material and intermixing the splayed end with a resin which when cured will form a rounded dimpled attachment 20 at the first end of the spoke, FIG. 3. As can be seen the resin will penetrate and form around the individual fibers strands within the first end of the non-rigid spoke. This resin impregnation may be used to form any of a variety of attachment means at the first or second end of the non-rigid fiber spoke.

At the second end 14 of the non-rigid spoke a presser foot attachment 22 is affixed to facilitate attachment of the non-rigid spoke to the wheel rim, FIGS. 1a and 1b. As shown in FIG. 4, the second end 14 of the fibrous non-rigid spoke of the present invention supports a presser foot 22 which may have a generally flattened and cut sides to form any variety of shapes such as a hexagonal shape allowing for the presser foot to be turned by means such as a conventional spoke wrench. An orifice 15 may be generally located within the presser foot 22 to accept a male screw or bolt extending from the rim, FIGS. 1a and 1b.

Any variety of other attachment means may be used in the present invention. For example, as seen in FIG. 5a, either end of the non-rigid spoke may be tied off in a knot 11 and inserted through a rivet 25 which may be popped in or out of the wheel hub or rim. As can be seen in FIG. 5a, the base of pop rivet 24 functions to support and retainably hold the knotted end 11 of the non-rigid spoke. The spoke may then be threaded through an opening 23 in the rivet 25 which feeds the spoke through a channel 23 of some finite length.

In use, the pop rivet may be inserted into the interior of a hub as a means of holding the first end 12 of the spoke within the hub or may be inserted into the interior of the rim as a means of holding the second end 14 of the non-rigid spoke.

In FIG. 5b, the inverse configuration is shown with the knotted end 11 of the non-rigid spoke 10 being threaded through an opening 23 through the rivet past the rivet base 24. In use, the rivet 25 may be popped into a wheel hub or rim with the rivet base 24 supporting the rivet against the hub or rim and the knotted end 11 of the non-rigid spoke being held in place at the channel opening 23 which is of smaller diameter than the knot 11.

The non-rigid spoke of the present invention may also be held in place by its own knotted end 11 on either the wheel hub or rim. Specifically, as can be seen in FIG. 5c, the non-rigid spoke is knotted and threaded through a hole 52 within the wheel hub 50. The diameter of the wheel hub hole 52 is formed to be smaller than the diameter of the knot 11 tied in the end of the non-rigid spoke.

As can be seen in FIG. 5d, the knotted end of the non-rigid spoke 10 is held in place at the hub 50 by the base 24 of a snap rivet which is, in turn, threaded through the hub hole 52. This embodiment of the present invention protects the non-rigid spoke from sharp ends or abrasions which may result in failure at hub hole 52. Moreover, the rivet allows for the spoke to spin freely within the circumference of the hub hole. This will prevent the spoke from binding up when an adjustment is made at the opposite end of the spoke to tighten the spoke or true the wheel.

Additionally, the fiber may be resin impregnated in region 53 (cross hatch FIG. 5d). Impregnation of this area of the spoke assists in distributing the stress along the radius of curvature and in transmitting the stress from the fibers to the hub of the wheel. The result is that the spoke itself is subjected to less stress over the life of the spoke.

Detachable means may also be used to attach the spoke to the wheel hub or rim. For example, as seen in FIG. 5e, the spoke end is here again knotted 11, but prior to knotting is inserted through an opening 23 in a presser foot 26. The presser foot 26 is, in turn, screwed into the rim 60. The presser foot 26 may have a recessed head 27 allowing the spoke knotted end 11 to rest within the plane of the rim 60 and presser foot 26 and not be exposed to the areas which may receive active mechanical or physical contact with elements of the tube or tire. The recessed head 27 of the presser foot 26 also serves as a seat for the knotted end 11 and aids in distributing the stress from the fibers to the attachment means and into the hub. Optionally, other means may be used in addition to knotting to secure the spoke end within the presser foot.

In use, this embodiment of the attachment means allows the non-rigid spoke first end 12 to be affixed at the hub 50 through any variety of means including knotting, dimpling, or any other means which will not readily provide for adjustment, i.e. tightening or truing. The second end 14 of the non-rigid spoke may be affixed at the rim 60 through a means which readily allows for tightening or truing by the use of means such as spoke wrenches fitted around the flattened sides 29 of the presser foot.

In use, this feature would allow an operator to remove a broken spoke from the wheel, thread the end of the spoke having a dimpled or knotted end through the hub, and insert the unobstructed end of the spoke into the presser foot. The operator would then merely have to knot the second end 14 of the non-rigid spoke to obstruct the presser foot from being removed from the spoke, and screw the presser foot into the rim.

Another alternative embodiment of adjustable attachment means useful in the present invention is an eye hook 28, FIG. 5f. Specifically, the second end 14 of the non-rigid spoke is threaded through the opening in the eye hook 28 and then woven back into itself. In turn, the eye hook may be threaded through opening 62 into a nut or set screw 30 at the base of the rim 60. The spokes may then be tightened and, in turn, the wheel trued, by screwing the eye hook further into the rim 60.

Along with being resin impregnated to create a dimpled end 20 the non-rigid fiber spoke 10 may be resin impregnated to provide for threads 31 at either end of the non-rigid spoke, FIG. 5g. In this instance, the non-rigid spoke of the present invention may be resin impregnated at either the first and/or the second end of the spoke.

Through molding and machining processes known to those with skill in the art, threads may then be formed at either end of the spoke by heating and molding the resin which is impregnated and rests within the filaments or machining the end of the spoke. The spokes are then attached to any wheel through the use of presser feet 32 having internal threads which complement the external threads 31 at the end of the non-rigid spoke.

In use, the presser foot 32 may be inserted through a hole 52 in the hub and angled upward, FIG. 5g. The non-rigid fiber spoke may then be manually screwed into the presser foot at either end of the spoke.

Figure 6A:
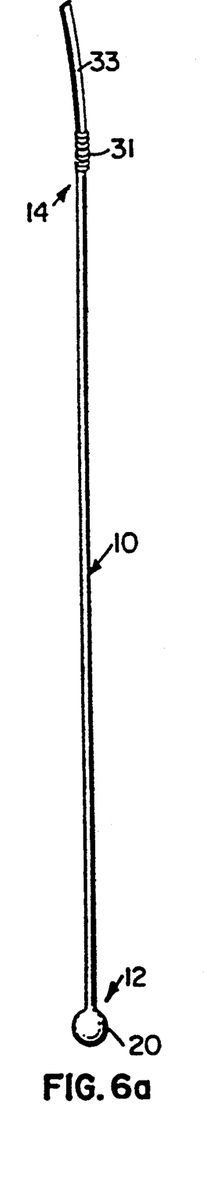
FIG. 6a is a side view of a third embodiment of a spoke constructed according to the principles of the present invention.
Figure 6B:
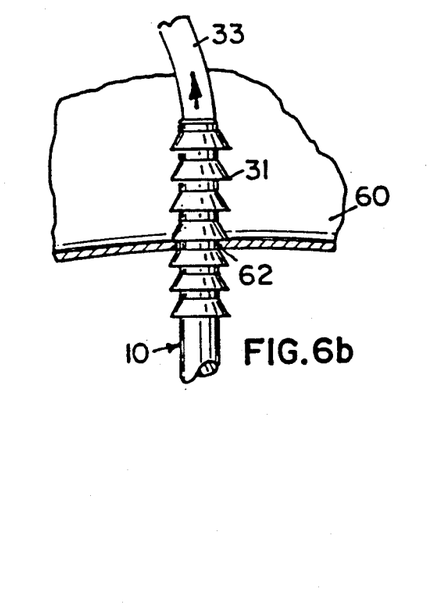
FIG. 6b is an enlarged view of the rim attachment means of the spoke shown in FIG. 6a, illustrating the spoke as secured to a wheel rim.
Figure 6C:
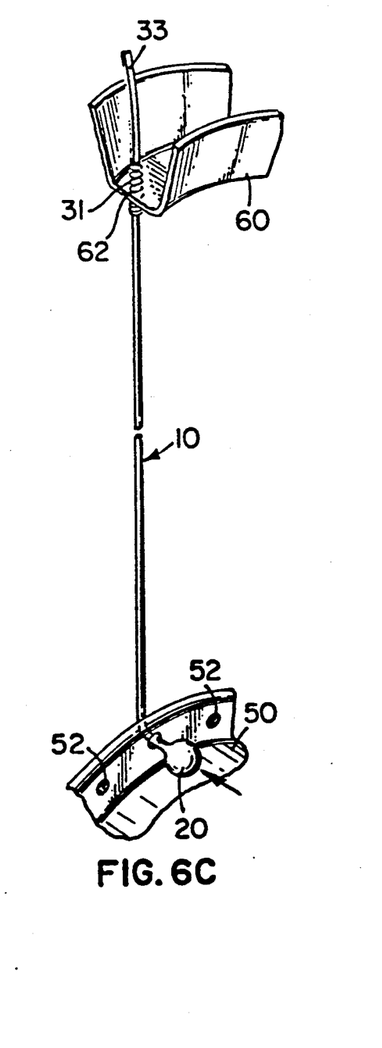
FIG. 6c is a fragmentary perspective view of the spoke of FIG. 6a illustrating the spoke in operative attachment to portions of a hub and wheel rim.

An additional alternative of an attachment means useful with the present invention is shown in FIGS. 6a–6c. In this embodiment the non-rigid spoke again has a resinous or metallic node 20 for attachment to the hub 50 at the first end 12 of the spoke. Spaced from the first end and generally adjacent the second end 14 of the spoke are a series of grooves or threads 31 formed in or by the spoke body, which are beveled to allow passage through an inlet 62 of fixed diameter in the rim 60, FIG. 6b. The beveling of the threads 31 also prevents loosening the spoke once tightened. Finally, this embodiment of the present invention comprises a tether or pull 33 at the second end of the spoke which may be used to tighten the spoke.

In use the spoke is threaded through the hub opening 52 and pulled towards the rim 60, FIG. 6c. The tether 33 is then inserted through the rim opening 62 and pulled to allow the threads 31 to engage the rim sidewalls which form the opening 62. The tether 33 may be released once the proper tension is created in the spoke. The beveling of the threads 31 will prevent the spoke from being loosened. The extended threads and tether may then be trimmed to avoid interference with the tire.

Such a system may be highly useful for emergency road repairs which if not completed might result in a wheel of poor structural integrity.

Figures 7A, 7B, 8A, 8B, 8C:
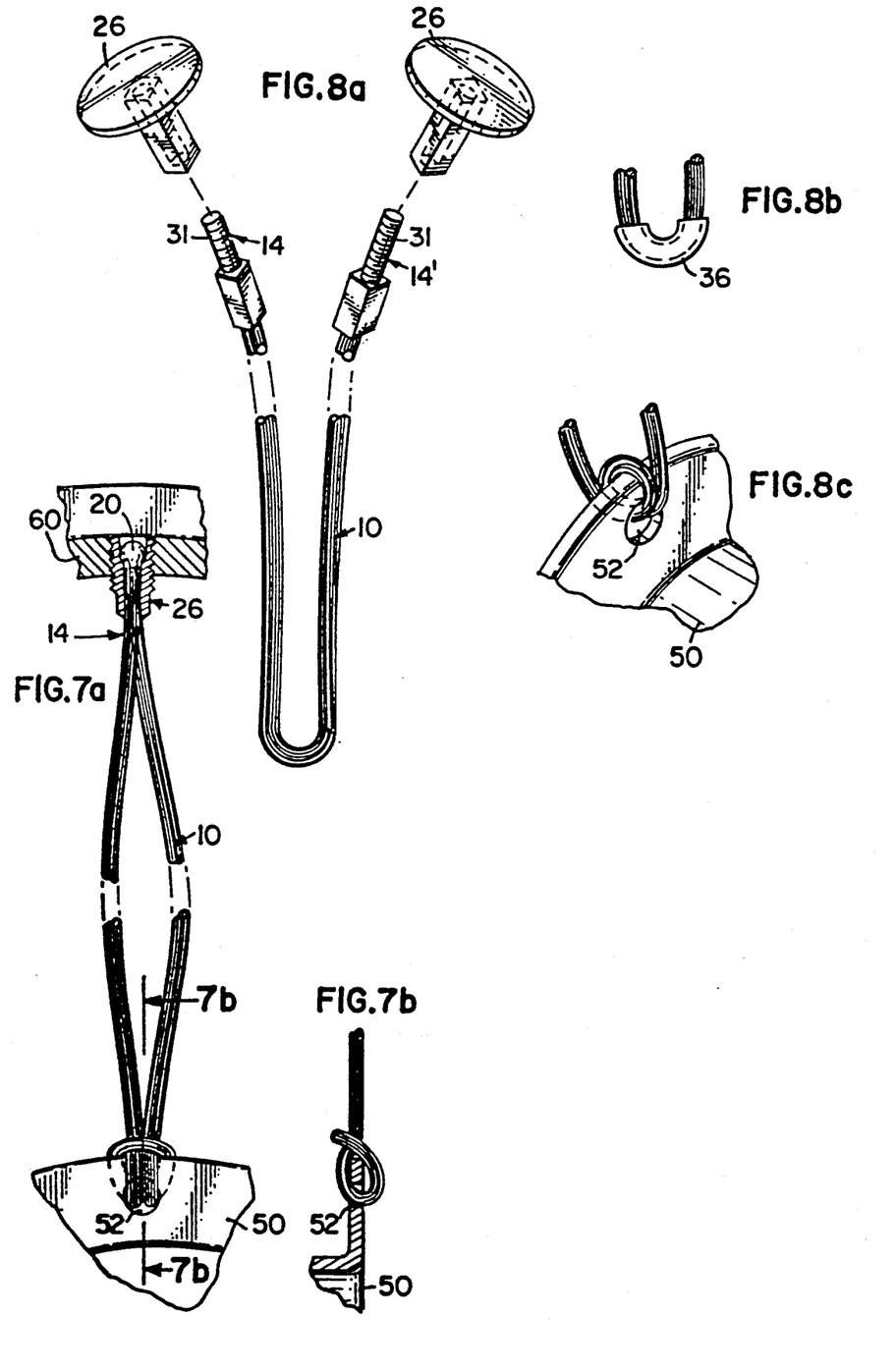

An alternative embodiment of the single length non-rigid spoke of the present invention can be seen in FIG. 7a where the spoke comprises a double length of non-rigid fiber which is knotted or resin impregnated at the second end 14 in order to provide a knotted or dimpled head 20. The double length of non-rigid continuous spoke is then threaded through a presser foot 26.

As shown in FIG. 7b, the length of spoke may then be inserted through a wheel hub 50 support hole 52 and looped around itself to be fastened securely to the hub 50. The presser foot may then be screwed into the rim 60 and tightened through any conventional means such as for example a spoke wrench. Here again, the spoke 10 fibers may be free to turn within presser foot 26 to facilitate tightening without binding, FIG. 7a. Alternatively, the rim 60 may be configured to receive the presser foot 26 through means which retainably hold the presser foot 26 while swiveling or turning as the presser foot is screwed into the rim to prevent binding of the non-rigid spoke.

In accordance with an alternative embodiment of the present invention, there is provided a "continuous" non-rigid wheel spoke as shown in FIG. 8a. Generally, the continuous non-rigid wheel spoke of present invention comprises a first end 12 and a second end 14 having a flexible mid-portion 10. The continuous non-rigid spoke may be affixed between a hub and rim through attachment means such as the threads 31 shown at both the first and second ends of the spoke.

Throughout the present invention the spoke may be affixed and tightened through means such as, for example, spoke wrenches or other mechanisms known to those having skill in the art.

Various complementary means may be used to affix or attach the spoke to the wheel hub and rim. In this particular instance, presser feet 26 are shown attached to the spoke first 12 and second 14 ends at the rim, FIG. 8a. In application, the spoke is threaded through the hub 50 which accepts the threading of the non-rigid continuous spoke. The non-rigid continuous spoke may be of any length providing a wheel having a continuous or semi-continuous network between the wheel and hub throughout the entire system.

One advantage of a "continuous" non-rigid spoke system over a discontinuous or "single length" non-rigid spoke system is a reduced amount of hardware necessary to secure the spoke to the rim and hub. The reduced hardware further reduces the weight of the wheel and in turn, the wheel requires less inertial force to initiate rotation and overall energy to maintain the velocity of the wheel over time. This savings in force and energy, in turn, translate into increased fuel economy regardless of the vehicle on which the wheel is used.

In use, the continuous non-rigid spoke may be repetitively strung between the hub and the wheel rim using protective sleeves 36 which may be used to insulate the non-rigid spoke from sharp metal edges at either the location of the rim or the hub, FIG. 8b.

Another means of applying the continuous non-rigid spoke of the present invention is to double loop the spoke through the hub at hole 52 thus effectively securing the spoke against slippage or movement when it is placed under stress as the wheel is actually used, FIG. 8c. Additionally, this embodiment provides a means of altering the length of the spoke during a field repair.

Here again, this invention alleviates problems encountered with the use of rigid metal spokes by varying the spoke's radius of curvature. The radius around which the fiber is wrapped may be altered to avoid non-uniform stress distribution through the diameter of the spoke. For example, a wire wound around a tight radius results in tensile stresses at the outside diameter surface of the wire and compression stresses at the inside of the wire.

The present invention avoids these stresses by using multiple filaments and minimizing the stress distribution gradient across any of the load bearing fibers. Secondly, various mechanical aids may be used to maximize this radius and in turn eliminate the deleterious effect of the narrowing radius.

Figure 9A:
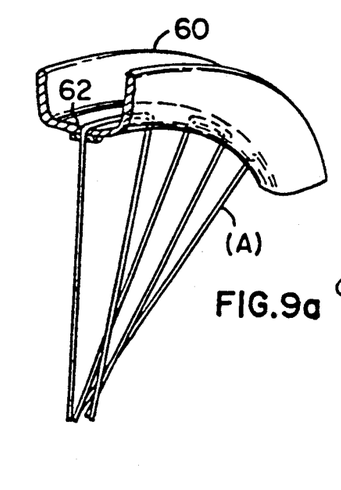
FIG. 9a is a fragmentary perspective view of one spoke pattern for securing a hub and wheel rim by means of a continuous spoke constructed according to the principles of this invention.
Figure 9B:
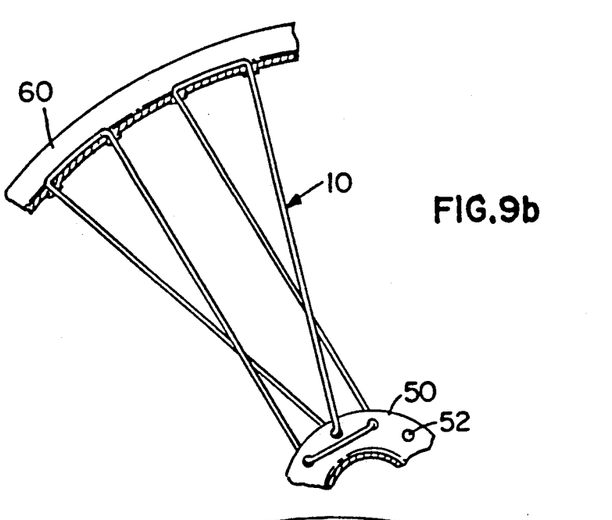
Figures 9C, 9D:
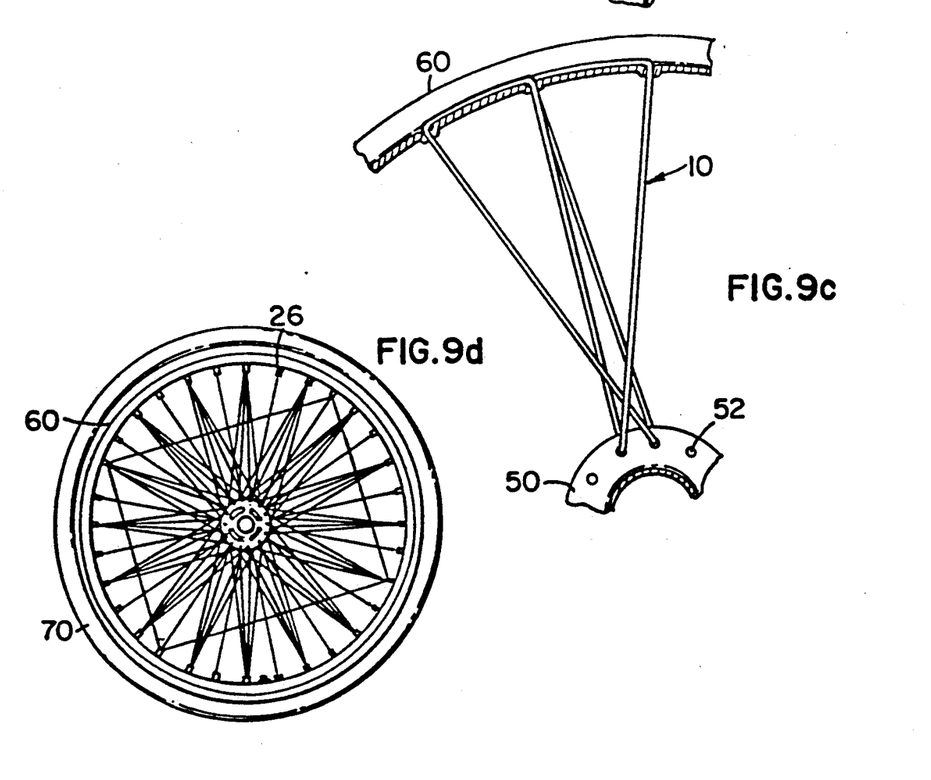
FIG. 9c is a fragmentary side view illustrating a second alternative spoke pattern for securing a hub and wheel rim in accordance with the present invention.
FIG. 9d is a side view of a complete wheel assembly illustrating a third alternative spoke pattern for interconnecting the hub and rim in accordance with the present invention.

An alternative to the double length of continuous non-rigid spoke is to provide a continuous non-rigid spoke having a length great enough to provide a continuous multi-path weave between the rim and hub of the wheel as shown in FIG. 9a. In this instance, any number of weaving patterns may be used which provide any variety of strengths to the given wheel including three cross patterns FIG. 9b and four cross patterns, FIG. 9c.

Figures 10A, 10B, 11, 12, 13:
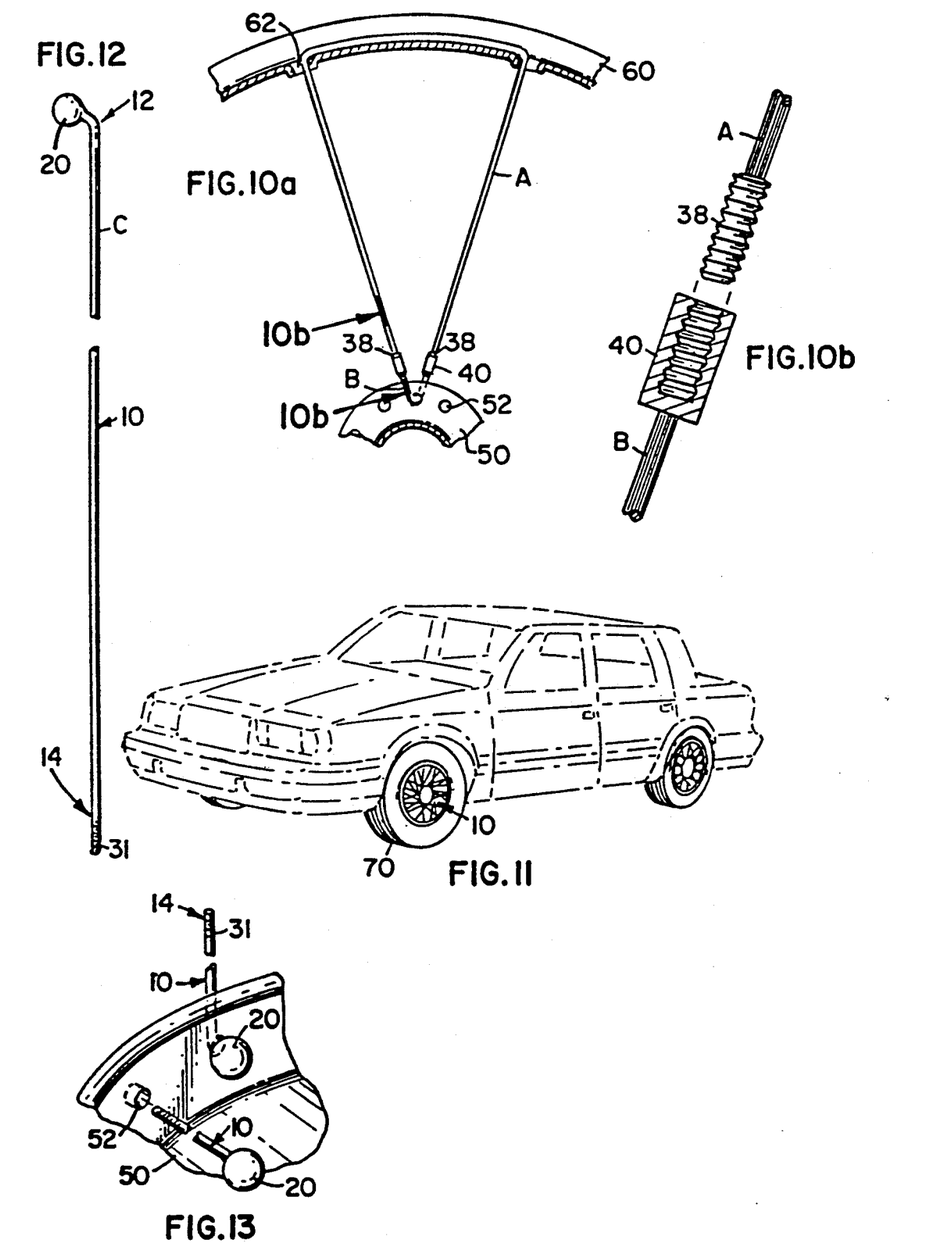

The weave pattern may include hub-to-rim configurations as well as patterns which have both hub-to-rim and rim-to-rim configurations. Specifically, weaving the spoke in an overlapping pattern between adjacent rim holes 62 without returning the weave to the hub assists in distributing external stress realized in use throughout the wheel and not merely back through the wheel hub. Here again, this weave pattern may take any variety of configurations such as the four sided weave shown in FIG. 9d. These spoke patterns are equally applicable to any of the embodiments of the present invention disclosed herein. A further alternative embodiment of the present invention is shown in FIG. 10a. In this instance, a continuous non-rigid spoke is suspended between the rim 60 and the hub 50. Two autonomous lengths of spoke, being respectively the longer length of spoke (A) which threaded through the rim 60 and the shorter length of spoke (B) which is threaded through central hole 52 at the hub 50 are connected, FIG. 10a.

In use, the spoke length (A) is attached to spoke length (B) through any variety of means including, for example, the screw 38 and nut 40 hardware shown in FIG. 10b. In this instance, the threaded end 38 of the spoke non-rigid (A) will be screwed into the threaded receiving nut 40 of spoke length (B). The nut 40 of the hardware may be set to swivel so that the spoke does not bind and become unadjustable. Locating the attaching hardware 38, 40 for the spoke adjacent the wheel hub 50 minimizes the amount of weight at the rim 60, and, in turn also minimizes the inertial force necessary to initiate rotation and maintain the rotational velocity of the wheel.

This advantage is especially relevant when the non-rigid spoke of the present invention is used in wheels 70 on vehicles such as automobiles or smaller, lighter weight vehicles where energy use considerations are especially relevant.

In accordance with an alternative embodiment of the invention there is provided a rigid unitary composite spoke (C) having a first end 12 and a second end 14 as well as a rigid mid-portion 10, FIG. 12. Here again, any variety of attachment means may be provided and as can be seen FIG. 12 a dimpled head 20 is located at the first end of the rigid spoke and threads 31 are located at the second end of the rigid spoke.

The unitary rigid spoke of the present invention (C) generally provides a much stronger lighter spoke than metal alloy spokes and, further, avoids the hysteresis problems shown by these metal spokes. In contrast to the previous embodiment of the present invention, this rigid composite spoke (c) supports the hub through compressive forces which facilitate the transfer of stresses encountered in use, such as road vibration throughout the wheel. Here again, the physical properties of the composite materials result in a wheel having superior structural integrity. Moreover, the unitary construction of this multifilament composite spoke avoids many of the stress and strain problems which may potentially result in failure of other multipiece spokes or single strand metal alloy spokes.

Generally, the rigid unitary spoke comprises a system of fibers impregnated with any variety of resins the fibers running the entire length of the spoke. Turning to the fibers first, they may be of any general type known to have a higher strength and low density so as to afford a savings in weight while still providing the requisite structural integrity. Moreover, the use of fibers running the entire length of the spoke and the impregnation of these fibers at critical stress areas in the spoke provides a system having high structural integrity. This spoke configuration overcomes any need for using metal alloys in the reinforcement of the stress points in the spoke.

Generally, the fibers that have been found useful in making this embodiment of the present invention are those materials having the physical characteristics found useful for the non-rigid embodiments of this invention including preferably aramid fibers, carbon fibers, boron fibers, and low density polyethylene fibers among others.

Resins which have been found useful in the composite article include any variety of thermoplastic or thermosetting polymeric materials which provide the requisite structural integrity to the rigid unitary spoke of the present invention similar to those found useful in making the attachment means used in the previous two embodiments. Resins useful in the present invention include epoxies, polyurethanes, silicones, polyesters, acrylics, polyimides, and polybutadienes.

For example, thermosetting systems which may be used as resins in the present invention include the reaction product of orthotolyl biguanide and bisphenol A-epichlorohydrin; triglycidyl isocyanurate compositions; bisphenol A-epichlorohydrin cured with a phenolic cross-linking agent; aliphatic urethane thermosetting compositions such as unblocked isophorone diisocyanate-e-caprolactan which may be cross-linked with a terminated polyester resin; the reaction product of 3,3,4,4-benzophenone tetracarboxylic dianhydride and bisphenol A-epichlorohydrin; the reaction product of carboxylated saturated polyester curing agents and bisphenol A-epichlorohydrin; as well as bisphenol A-epichlorohydrin thermosets which are cured with 2-methyl imidazole; and standard bisphenol A-epichlorohydrin thermosets which are cured with 2-methyl imidazole and diicyandiamide among other cross-linking agents.

A thermoplastic resin may also be used to form the rigid spoke of the present invention. Here again, thermoplastics of any general nature may be used, some examples include polyphenylene sulfide, polyformaldehyde or acetal polyurethanes, polyamides including nylon-(6,6), nylon-(6), nylon-(6,12), nylon-(11), nylon-(12), polypropylene, polyethylene, polyether ether ketone, polybutylene terephthalate, polyethylene terephthalate, polycarbonate, polystyrene, styrene acrylonitrile, polyether imide, and polyamide imide among others.

Generally, the unitary rigid spokes of the present invention may be prepared by composite processes well known to those of skill in the art including combining the fiber and resin to form a preimpregnated composition of varying thickness, width, or fiber orientation within the preimpregnated composition, and then by curing the preimpregnated composition if necessary.

For example, a fiber tow may be fitted onto a freely spinning unwinding creel. The fiber unwinds from the creel between two tension bars onto guide bowls, which align the fibers so that it properly enters a sealed reservoir of resin. A stainless steel metering dye may be used to align the fiber and seal the reservoir.

As the fiber enters the reservoir, it passes through impregnating material and over spreader bars which separate the individual strands of the fiber.

The fiber may leave the reservoir through another stainless steel metering dye, which forces the impregnating material and fiber together, meters the amount of impregnating material that goes into the fiber, and sets the diameter of the resulting impregnating fiber. The impregnated fibers may then be processed into a finished spoke.

In application, the resin fiber may merely be inserted through the hole 52 within the hub 50 and then drawn through the hub 50 towards the rim in the same manner as a conventional spoke, FIG. 13. Preferably, the spoke second end 14 is formed to have threads 31 which may be affixed additionally to an adjustable presser foot which sits in the base of the rim.

The rigid unitary spoke of the present invention may be used in any variety of wheel configurations such as, for example, 3 cross and 4 cross patterns similar to those used with the non-rigid spoke of the present invention as seen in FIGS. 9a-9d. A series of rigid unitary spokes may be used in a bicycle wheel. The actual pattern or overlap between each of the unitary spokes and the wheel may be varied depending upon the strength versus weight characteristics the user intends the wheel to have.

Working Examples are now provided to further exhibit the advantages of the present invention. However, these Working Examples should not be viewed as limiting of the present invention but merely as examples of various embodiments of the invention claimed herein.

WORKING EXAMPLES

Example 1

A spoke constructed according to a first example utilized a hollow, threaded, brass sleeve through which a 15,000 denier, Kevlar(R) 29 (Type 960), fiber bundle was threaded and knotted. The other fiber end was threaded through an aluminum rivet and a knot placed in the end of the fiber. This example demonstrated that Kevlar(R) can effectively be combined with metallic materials and bridge the material gap between the fiber chemistry and the chemistry of metallic materials. This fiber was subsequently weaved into a wheel.

Example 2

The spoke of this example utilized the same fibers as Example 1. The fibers were coated with a General Electric, Room Temperature Vulcanizing (RTV) Clear Silicone Sealant by hand coating.

After coating the fibers were allowed to cure under room temperature conditions for a period of 24 hours after which one end of the coated fibers was threaded through the drilled out center of a conventional spoke presser foot. The spoke was then threaded through a preformed hole in the rim. The opposite end of the fibers was tied directly to the hub.

Example 3

The spoke of this example utilized the same fibers as in Example 1. The fibers were coated with a 3M Company #3764 hot melt thermoplastic adhesive by a fiber separating pultrusion process. The process consisted of separating the ten individual 1500 denier fiber bundles from the overall fiber strand, after which the hot melt adhesive was applied to the individual fiber bundles at the same time the ten bundles were brought together. The speed of the process allowed the hot melt adhesive to cool prior to winding up the coated fiber strand. This fiber was then used to construct the same type of spoke as in Example 1.

Example 4

The spoke of this example utilized the same fibers as in Example 1. A fiber strand was first separated into ten individual fiber bundles, 1500 denier each. Each fiber bundle was coated with a 3M Company #3764 hot melt thermoplastic adhesive by running the fiber bundles through a slit in a 3 mm thick sheet of Teflon(®), which was used as a coating die for the molten adhesive. The coated fiber bundle was then used to string a 27" bicycle wheel using a complex 3 and 4 cross weaving pattern which allowed each fiber to be oriented in a fail safe manner. A conventional square knot was used to secure each fiber bundle by wrapping the loose ends around the hub. This allowed the fiber bundles to be stressed.

Example 5

The spoke of this example used the fibers of Example 1. A knot was tied in the end of the fiber strand after which the knot was threaded through a 15 inch long, piece of heat shrinkable tubing. A heat gun was used to shrink the tube around the fiber strand and knot. This example demonstrates a means of protecting the fiber strand with a protective heat shrinkable exterior plastic sheath, without impregnating the fibers.

Example 6

The spoke of this example used the fibers of Example 1. A Red Devil, satin, polyurethane wood varnish was used to coat the fiber strand. The solvents in the varnish were allowed to dry for 24 hours prior to constructing a finished spoke consistent with Example 1.

Example 7

The spoke of this example utilized the same fibers and coating as Example 6. The coated fiber strand was tied to one side of bicycle hub. The other end of the fiber strand was threaded through an eyebolt, which was, in turn, fastened to the rim of the wheel. The eyebolt was then rotated which caused the coated fiber to become uniformly twisted, thereby tightening the fiber bundle between the rim and hub of the wheel.

Example 8

The spoke of Example 7 was constructed and fastened to a hub and rim avoiding the twisting of the spoke by tightening a nut within the rim onto the end of the eyebolt.

The above discussion, examples, and data illustrate our current understanding of the invention. However, since many variations of the invention can be made without departing from the spirit and scope of the invention, the invention resides wholly in the claims hereinafter appended.

I claim:
1. A non-rigid spoke comprising:
   (a) a flexible mid-portion extending between first and second ends said flexible mid-portion comprising a non-rigid spoke material;

(b) a first attachment means affixed adjacent said spoke first end; and (c) a second attachment means affixed adjacent said spoke second end wherein said spoke has a tensile strength of at least about $0.2 \times 10^6$ psi, said non-rigid spoke material flexes without mechanical failure and is load supporting only in tension.

2. The non-rigid spoke material of claim 1 wherein said non-rigid mid-portion comprises a material having a modulus of elasticity greater than 1 million psi, an ultimate elongation of about 0.01% to 20%, and a tensile strength greater than about $0.2 \times 10^6$ psi.

3. The non-rigid wheel spoke of 2 wherein said spoke material comprises a non-rigid material, said material selected from the group metallic materials, nonmetallic materials, and mixtures thereof.

4. The non-rigid spoke of claim 3 wherein said non-rigid material is selected from the group consisting of aramid fibers, carbon fibers, boron fibers, glass fibers, graphite fibers, polyolefin fibers, ceramic fibers, or combinations thereof.

5. The non-rigid spoke of claim 1 wherein at least one of said first or second attachment means comprises a dimple head.

6. The non-rigid spoke of claim 1 wherein at least one of said first or second attachment means comprises the knotted end of said spoke.

7. The non-rigid spoke of claim 1 wherein at least one of said first or second attachment means comprises a presser foot.

8. The non-rigid spoke of claim 1 wherein at least one of said first or second attachment means comprises an eyehook.

9. The non-rigid spoke of claim 1 wherein at least one of said first or second attachment means comprises a rivet.

10. The non-rigid spoke of claim 1 wherein at least one of said first or second attachment means comprises beveled retaining teeth.

11. The non-rigid spoke of claim 1 additionally comprising a sheath covering at least a portion of the flexible mid-portion.

12. The non-rigid spoke of claim 11 wherein said covering sheath comprises a polymeric coating.

13. The non-rigid spoke of claim 11 wherein said covering sheath comprises woven fibers.

14. A vehicle wheel comprising:
(a) a wheel hub;
(b) a wheel rim; and
(c) a plurality of non-rigid wheel spokes each comprising a flexible mid-portion, said flexible mid-portion comprising a non-rigid spoke material, a first attachment means affixed adjacent said spoke first end, and a second attachment means affixed adjacent said second end, wherein said spokes traverse between said hub and said rim, said spokes connectably supporting said hub within the circumference of said rim wherein said spoke has a tensile strength of at least about $0.2 \times 10^6$ psi, said non-rigid spoke material flexes without mechanical failure and is load supporting only in tension.

15. The wheel of claim 14 wherein said spokes traverse between said hub and rim in a three-cross pattern.

16. The wheel of claim 14 wherein said spokes traverse between said hub and rim in a four-cross pattern.

17. The wheel of claim 14 additionally comprising a continuous non-rigid spoke which traverses from one point of the rim to another point of the rim.

18. A vehicle comprising wheels, each of said wheels comprising:
(a) a wheel hub;
(b) a wheel rim; and
(c) a plurality of non-rigid wheel spokes each comprising a flexible mid-portion, said flexible mid-portion comprising a non-rigid spoke material and having a tensile strength of at least about $0.2 \times 10^6$ psi, a first attachment means affixed adjacent said spoke first end, and a second attachment means affixed adjacent said second end, wherein said spokes traverse between said hub and said rim, said spokes connectably supporting said hub within the circumference of said rim wherein said non-rigid spoke material flexes without mechanical failure and is load supporting only in tension.

19. A method of using a non-rigid spoke comprising a first end and a second end having a flexible mid-portion therebetween, said flexible mid-portion comprising a non-rigid spoke material and having a tensile strength of at least about $0.2 \times 10^6$ psi, a first attachment means affixed adjacent said spoke first end, and a second attachment means affixed adjacent said spoke second end, said method comprising the step of respectively affixing said first and second ends of said non-rigid wheel spoke to said wheel hub and rim wherein the hub is in tension support within the circumference of the rim when said spoke is tightened wherein said non-rigid spoke material flexes without mechanical failure and is load supporting only in tension.

20. The method of claim 19 additionally comprising the step of attaching a plurality of said non-rigid spokes to said hub and said rim.

21. The method of claim 20 additionally comprising the step of tightening said non-rigid spokes to connectably support said hub within the circumference of said rim.

22. The method of claim 21 additionally comprising the step of truing said spokes attached to said hub and rim.

23. A non-rigid continuous spoke comprising:
(a) a flexible mid-portion extending between a first and second end;
(b) a first attachment means affixed adjacent said spoke first end said flexible mid-portion comprising a non-rigid spoke material; and
(c) a second attachment means affixed adjacent said spoke second end, said spoke mid-portion being of a length suitable for forming a continuous network between the hub and rim of a wheel wherein said spoke has a tensile strength of at least about $0.2 \times 10^6$ psi, said non-rigid spoke material flexes without mechanical failure and is load supporting only in tension.

24. The non-rigid spoke material of claim 23 wherein said non-rigid mid-portion comprises a material having a modulus of elasticity greater than 1 million psi, an ultimate elongation of about 0.01% to 20%, and a tensile strength greater than about $0.1 \times 10^6$ psi.

25. The non-rigid wheel spoke of claim 23 wherein said spoke material comprises a non-rigid material said material selected from the group consisting of metallic material, nonmetallic material, and combinations thereof.

26. The non-rigid spoke of claim 25 wherein said non-rigid, nonmetallic material is selected from the group consisting of aramid fibers, carbon fibers, boron fibers, copper fibers, glass fibers, graphite fibers, polyolefin fibers, ceramic fibers or combinations thereof.

27. The non-rigid continuous spoke of claim 23 wherein the length of said spoke as measured between said first and second attachment means is longer than the radial distance between said hub and said wheel rim.

28. The non-rigid spoke of claim 27 wherein the length of said spoke is longer than the radial distance between the rim and hub and the first and second ends of the spoke are affixed adjacent the hub.

29. The non-rigid spoke of claim 23 wherein the non-rigid mid-portion of the spoke is insulated from the hub by a protective sleeve.

30. The non-rigid spoke of claim 23 wherein at least one of said first or second attachment means comprises a dimple head.

31. The non-rigid spoke of claim 23 wherein at least one of said first or second attachment means comprises the knotted first end of said spoke.

32. The non-rigid spoke of claim 23 wherein at least one of said first or second attachment means comprises a presser foot.

33. The non-rigid spoke of claim 23 wherein at least one of said first or second attachment means comprises an eyehook.

34. The non-rigid spoke of claim 23 wherein at least one of said first or second attachment means comprises a rivet.

35. The non-rigid spoke of claim 23 wherein at least one of said first or second attachment means comprises retaining teeth.

36. The non-rigid spoke of claim 23 additionally comprising a sheath covering at least a portion of the flexible mid-portion.

37. The non-rigid spoke of claim 36 wherein said covering sheath comprises a polymeric coating.

38. The non-rigid spoke of claim 36 wherein said covering sheath comprises woven fibers.

39. A wheel comprising:
    (a) a wheel rim;
    (b) a wheel hub; and
    (c) the non-rigid continuous spoke comprising a flexible mid-portion extending between a first and second end, said flexible mid-portion comprising a non-rigid spoke material, a first attachment means affixed adjacent said spoke first end, and a second attachment means affixed adjacent said spoke second end, wherein said spoke has a tensile strength of at least about $0.2 \times 10^6$ psi, said non-rigid spoke material flexes without mechanical failure and is load supporting only in tension and said non-rigid continuous spoke forms a continuous or semicontinuous network between said rim and said hub and spokes connectably supporting said hub within the circumference of said rim.

40. The wheel of claim 39 wherein said spokes traverse between said hub and rim in a three-cross pattern.

41. The wheel of claim 39 wherein said spokes traverse between said hub and rim in a four-cross pattern.

42. The wheel of claim 39 additionally comprising a continuous non-rigid spoke which traverses from one point of the rim to another point of the rim.

43. A vehicle comprising the wheels, each of said wheels comprising:
    (a) a wheel rim;
    (b) a wheel hub; and
    (c) at least one non-rigid continuous spoke comprising a flexible mid-portion extending between a first and second end, said flexible mid-portion comprising a non-rigid spoke material and having a tensile strength of at least about $0.2 \times 10^6$ psi, a first attachment means affixed adjacent said spoke first end, and a second attachment means affixed adjacent said spoke second end, wherein said non-rigid continuous spoke forms a continuous or semicontinuous network between said rim and said hub and spokes connectably supporting said hub within the circumference of said rim wherein said non-rigid spoke material flexes without mechanical failure and is load supporting only in tension.

* * * * *